Patented Apr. 3, 1934

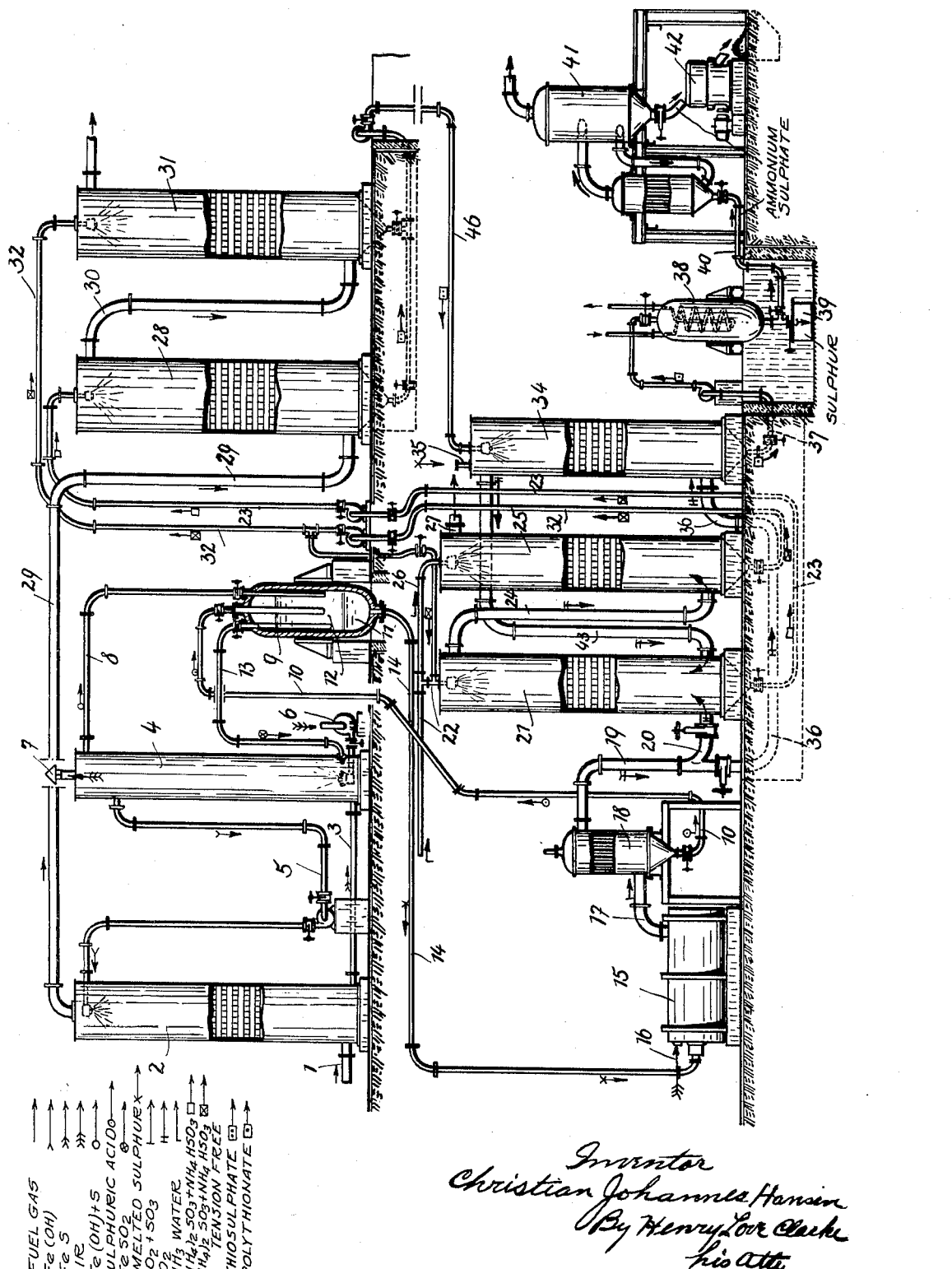

1,953,478

UNITED STATES PATENT OFFICE 1,953,478

PROCESS FOR REMOVING HYDROGEN SULPHUR AND AMMONIA FROM GASES

Christian Johannes Hansen, Essen, Germany, assignor, by mesne assignments, to The Koppers Company of Delaware, Pittsburgh, Pa., a corporation of Delaware Application June 13, 1931, Serial No. 544,255
In Germany June 14, 1930

8 Claims. (Cl. 23—225)

The invention relates to a process for separating ammonia and hydrogen-sulphide from gases, for example coal distillation gases for the recovery of ammonium-sulphate and sulphur and especially for a process for separating ammonia and hydrogen-sulphide from such gases which contain more hydrogen-sulphide than corresponds to the proportion of 2 molecules of ammonia and 1 molecule of hydrogen-sulphide.

It is well-known that ammonia and hydrogen sulphide can be washed out from gases by means of solutions of ammonium thionates. The expression thionate in this description is understood to include the salts of sulphurous acid, of thiosulphurous acid and polythionates or mixtures of these compounds. By the use of solutions of these ammonium thionates it is not possible to free gases from ammonia and hydrogen sulphide if the excess of hydrogen sulphide is very large. Furthermore the quantitative separating of hydrogen sulphide from gases by means of thionates gives rise to difficulties.

Now the object of the invention is the provision of a process for separating ammonia and hydrogen sulphide from gases for the production of ammonium sulphate and sulphur which permits washing out ammonia and hydrogen sulphide in any desired proportion with the recovery of ammonium sulphate and sulphur therefrom and at the same time accomplishing this quantitatively from gases, for example coal distillation gases. The process according to this invention consists substantially therein that iron sulphide is produced from a portion of the hydrogen sulphide of the gas by washing the gas with a watery metallic hydroxide suspension, preferably iron hydroxide suspension, and by oxidation of the iron sulphide sulphur is produced which is burnt entirely or partly to sulphur dioxide which latter is combined with ammonium to produce ammonsulphite-bisulphite that is then converted in a washer by the remaining hydrogen sulphide of the gas to be purified entirely or partly into thiosulphate whereupon the latter by sulphurous acid is converted partly or entirely into polythionate and finally by heating the solution under pressure ammonium sulphate and sulphur are obtained. In this process the reactions take place as shown by the following equations:

$$2Fe(OH)_3 + 3H_2S = 2FeS + S + 6H_2O$$
$$2FeS + 3O + 3H_2O = 2Fe(OH)_3 + 2S$$
$$4NH_4HSO_3 + 1H_2S =$$
$$(NH_4)_2S_2O_3 + (NH_4)_2S_3O_6 + 3H_2O$$
$$(NH_4)_2S_3O_6 + 3H_2S = (NH_4)_2S_2O_3 + 4S + 3H_2O$$
$$2(NH_4)_2S_2O_3 + 3SO_2 = (NH_4)_2S_3O_6 + (NH_4)_2S_4O_6$$

According to the invention it is preferable, in washing the gas with the ammonium sulphite bisulphite solution first produced that a quantity of ammonium sulphite bisulphite be used so that to one molecule hydrogen sulphide in the gas to be purified 4 molecules of ammonium bisulphite are present in the solution. In this proportion of ammonium bisulphite to hydrogen sulphide the absorption of the hydrogen sulphide practically is effected in the way shown by the above equation 3. This reaction runs almost momentaneously and permits of a perfect quantitative washing out of the hydrogen sulphide.

Furthermore, according to this invention the mixture of sulphur and iron hydroxide which results from the oxidation of iron sulphate according to the customary separation of iron salts together with sulphuric acid is heated under and the iron sulphate heated under pressure together with sulphuric acid thereby formed is then separated from the liquid sulphur and led back to the iron salts hydroxide suspension.

A further object of this invention is the provision in said process of the further steps of burning the sulphur precipitated by the oxidation of the iron sulphate to produce a gas which contains sulphur dioxide and sulphur trioxide and from which the sulphur trioxide is precipitated in the form of sulphuric acid which is employed for the separating of the iron hydroxide from the sulphur.

Finally an object of the invention is the step in the process set forth wherein from sulphur dioxide and ammonia recovered from the gas to be purified an acid ammonium sulphite-bisulphite solution is obtained which by the action of ammonia and the hydrogen sulphide is converted into ammonium thiosulphate and ammonium polythionate, whereby the sulphur dioxide carried out from the washing liquors by the gases is separated by washing said gases with an ammonium sulphite-bisulphite solution having no vapor tension of ammonia nor of sulphur dioxide.

On the drawing apparatus is shown in a side elevational view partly in section for the carrying out of the process according to this invention.

In the apparatus shown in the drawing, the gas to be purified enters by the pipe 1 first into a washer 2 in which it is brought into contact with iron hydroxide suspension in water.

This iron hydroxide suspension after the iron hydroxide contained in it has been completely or partly converted into iron-sulphide is carried continuously or intermittently through pipe line 3 in the oxidizer 4 from which the solution is returned by means of the pipe 5 to the washer 2. At the foot of the oxidizer by means of a pump 6 air is blown into the washing solution which during a somewhat long travel is brought into contact with the liquid thereby converting the iron-sulphide into iron hydroxide and sulphur. The spent air escapes from the oxidizer 4 at the point 7 whereas the sulphur produced during the regeneration of the washing solution is drawn off through the pipe line 8 continuously or intermittently in a pressure vessel 9.

In the pressure vessel 9 the liquid, consisting of water, sulphur and iron hydroxide and sulphuric acid added by the pipe line 10, is heated to such a temperature that the sulphur contained in the solution is smelted and collects on the bottom of the pressure vessel as shown at 11. Above the sulphur there is after the completion of the smelting process an aqueous solution 12 of iron sulphate, which can be returned from the pressure vessel through the pipe line 13 into the oxidizer 4 and thence into the washer 2.

In consequence of the reaction of iron sulphate with ammonia and hydrogen sulphide in the absorber 2 according to the equation $$FeSO_4 + 2NH_3 + H_2S = FeS + (NH_4)_2SO_4$$

the washing fluid is gradually enriched by ammonium sulphate. In order to recover this ammonium sulphate, a portion of the washing fluid which passes through the hydroxide washer 2 and the oxidizer 4 is drawn off continuously or intermittently from the bottom of the washer 2 and after filtration for the purpose of removing the insoluble material (iron compounds and sulphur) is led off to the evaporator 41.

The sulphur precipitated in the pressure vessel 9 passes through the pipe line 14 in a sulphur burner 15 to which by the pipe line 16 so much air is supplied that at the end of the oven a gas containing sulphur dioxide and sulphur trioxide escapes through the pipe line 17. From these two components the sulphur trioxide is separated in a $SO_3$ separator 18, for instance by an electrical precipitation simultaneously with water, in the form of sulphuric acid, which is drawn off from the separator 18 and is carried forward by the pipe line 10 into the pressure vessel 9 for the purpose of dissolving out the iron hydroxide which is held mechanically by the sulphur. After passing through the separator 18 the residual burner gases reach by the pipe lines 19 and 20 the washer 21 to which ammonia in the form of concentrated ammonia water is brought from above through the pipe line 22. The quantity of ammonia is so measured that through the pipe line 23 provided for on the bottom of the washer 21 an ammonia sulphite-bisulphite solution having a sulphurous acid tension flows off.

From the washer 21 the burner gases go forward through the pipe line 24 to a washer 25 in which likewise from above by the pipe line 26 ammonia water is supplied, in this case however in such quantities that in the washer 25 an ammonium sulphite-bisulphite solution results having no tension of ammonia nor sulphur dioxide so that the waste air escaping from the pipe line 27 does not contain sulphurous acid.

The acid sulphite-bisulphite solution produced in the washer 21 is led through pipe line 23 into a washer 28 at the foot of which by the means of the pipe line 29 the gas from the iron hydroxide washer 2 which still contains hydrogen sulphide is introduced. The gas comes therefore in the washer 28 in contact with the acid sulphite-bisulphite solution whereby in accordance with the equation given above it loses its entire contents of ammonia and hydrogen sulphide. The gas takes up however in this washer correspondingly to the acid tension of the washing fluid used in this washer a certain amount of sulphur dioxide. In order to get this out of the gas, the latter is carried forward through the pipe line 30 in a washer 31 which is sprayed from above with a tension free ammonium sulphite-bisulphite solution produced in washer 25 for which purpose the washer 31 is connected up with the washer 25 by the pipe line 32. The spent washing fluid from the washers 28 and 21 flows through a common pipe line 46 into a washing tower 34 in which the ammonium thiosulphate contained in the spent liquor is converted wholly or partly into polythionate by means of sulphurous acid which is supplied by the pipe line 36 into the washer 34. In case the spent liquor has too great a content of ammonium-sulphite or (and) ammoniumbisulphite, sulphur is added to the liquor in the washer 34 through the pipe 35, whereby according to the equation $$(NH_4)_2SO_3 + S = (NH_4)_2S_2O_3$$

thiosulphate is formed. The solutions flowing off from the washing tower 34 finally reach through the pipe line 37 a pressure vessel 38 in which they are converted by means of heating under pressure up to a temperature above 160° C. into ammonium sulphate and sulphur. The sulphur resulting which collects during and after the reaction on the bottom of the pressure vessel 38 is led off into the sulphur boxes 39 whereas the sulphate solution is led forward under pressure through the pipe line 40 into an evaporating apparatus 41 in which the sulphate of ammonia solution is concentrated up to the point of crystallization. The salts thrown down is finally dried in a centrifugal 42.

Instead of dividing up the gases from the sulphur burners 15 and carrying them separately to the washer 21 and the washer 34 it may under certain circumstances be of advantage to pass these gases from the burners 15 first entirely through the washing tower 34 and from there to carry them forward through the pipe 43 into the washer 21. The distribution of the gases from the grate can be arranged by suitable adjustment according to the working conditions.

Instead of using two pressure vessels, as shown in the drawing, for the separation of a hydroxide from the sulphur and for the decomposition of the ammonia and polythionate solutions separate, one may of course employ, for both operations, the same pressure vessel.

The carrying out of the preferred mode of the process according to the invention employing the apparatus shown on the drawing, as follows.

(1) In the following example it is assumed that there are 120,000 cbm. or hourly 5000 cbm. of gas to be completely free of ammonia and hydrogen sulphide which, per cubic meter, contains about 9 grams $NH_3$ and about 21.4 grams $H_2S$ i. e. ammonia and hydrogen sulphide in the relation of 1 molecule $NH_3$ to 2 molecules $H_2S$.

In carrying out the process according to the invention the gases to be purified, in case they contain cyanogen compounds, are freed from the cyanogen compounds in a well-known manner by the formation of rhodanammonium.

These are better worked up together with the polythionate solutions in the pressure vessel 38 to ammonia sulphate and sulphur.

By cooling and washing of the gases with water, the entire ammonia contents is separated out in the form of gas water which is, as customary, subjected to a treatment of distillation with lime. In this connection there is produced 354.6 kilos hourly of a concentrated ammonia liquor of about 17% NH₃. The distillation of the crude ammonia water is so carried out in a well-known manner that, in the fraction between the exit of the volatile and of the fixed ammonia, the hydrogen sulphide contained in the ammonia water, in the form of sulphide of ammonia is driven out separately and the vapours escaping during this part of the distillation process are returned to the gas to be purified.

The gas is now washed in the tower 2 with an aqueous suspension of iron hydroxide which contains about 5 grams iron salts per liter. The circulation and the quantity of the washing fluid is so adjusted that hourly about 91.6 kilos iron in the form of iron hydroxide come into contact with the gas. In addition to the iron hydroxide the solution in tower 2 still contains ferro-sulphate and this in such quantity that hourly about 11.4 kilos FeSO₄ come in contact with the gas. There is supplied hourly about 2.6 kilos NH₃ in the form of concentrated NH₃ water so there will be washed out altogether by means of the iron hydroxide and the ferro-sulphate in tower 2 per hour 86.3 kilos H₂S. Therefore there is produced 150.8 kilos FeS and 26.2 kilos S hourly together with 10 kilos (NH₄)₂SO₄. In the oxidizer the iron sulphide is converted back into hydroxide; hourly 95.5 kilos of iron are produced in the form of iron hydroxides and 54.8 kilos S are formed. The elementary sulphur is removed thereupon so far as possible from the iron salts contained in the washing liquor. There is obtained per hour altogether 80.2 kilos S to which adheres still about 10% iron salts (hydroxide) equal to 4.2 kilos Fe.

In order to separate these iron salts out from the sulphur the latter is heated up in autoclave 12 with 7.25 kilos sulphuric acid per hour in diluted form under pressure. Then there results about 11.4 kilos FeSO₄ per hour which is led off again to the washing solution in the tower.

(2) The pure sulphur separated in the autoclave 12 is burnt in oven 15 together with a small quantity of the sulphur separated at the end of the process in the decomposing autoclave 38. Altogether the throughput amounts there to 82.36 kilos S per hour. From the resulting gases from the grate there are separated out in the apparatus 18, 5.9 kilos SO₃ in the form of sulphuric acid which is used in the autoclave 12 for the purification of the raw sulphur from the oxidizer 4.

The oven 15 supplies hourly 160 kilos SO₂. This is brought in tower 25 together with 353 kilos concentrated ammonia water 17%, whereby about 458.5 kilos of a tension free solution of ammonium sulphite and ammonium-bisulphite are produced hourly.

This solution is circulated continuously through the towers 25 and 31, a portion of the solution is carried forward continuously or intermittently into the tower 21 in such a quantity that it takes up there from the burner gases hourly about 53.5 kilos SO₂. Here there results per hour 557 kilos of about 45% of a bisulphite solution, which is now used in the tower 28 for the washing of the gas. This solution takes up hourly from the gas 21.25 kilos H₂S.

There is received at the bottom of the tower 23 hourly 578.2 kilos of a fluid which contains in addition to water about 92 kilos ammonium thiosulphate and 142 kilos ammonium polythionate. This solution is carried forward through the washer 34 which serves in the case of the example in question as an equalizing medium to the autoclave 38, in which the solution is treated up under pressure. Thereby are formed hourly 55.3 kilos elementary sulphur, 165.5 kilos ammonium sulphate and 20.6 kilos sulphuric acid. Here also is added continuously a portion of the spent washing liquor from the oxide washer 2 after the salts having been separated, and in such quantity that 10 kilos of the ammonium sulphate are supplied to the solution.

Therefore in the case of the present example about 208.1 kilos ammonium sulphate are produced with about 4.5% free acid which of course may be neutralized by the addition of further NH₃ and 52.7 kilos of pure elementary sulphur.

The invention as hereinabove set forth is embodied in a particular form of construction, but may be variously embodied within the scope of the claims hereinafter made.

I claim

1. A process for the removing of ammonia and hydrogen sulphide from gases, for instance coke oven gases, which contain more hydrogen sulphide than corresponds to the proportion 2 molecules NH₃ to 1 molecule H₂S, by recovery of ammonium sulphate and sulphur comprising separating from the gases ammonia, washing the gas with an aqueous suspension of a metal hydroxide and thereby removing the excess of hydrogen sulphide over said proportion, converting the thereby formed metal sulphide by oxidation into metal hydroxide and sulphur, separating and burning said sulphur and combining sulphur dioxide therefrom and the aforesaid separated ammonia and water into an aqueous solution of ammonium bisulphite, washing the gas still containing said proportion of hydrogen sulphide with said ammonium bisulphite solution and finally heating the spent solution from the last mentioned step until the thionates are converted into ammonium sulphate and sulphur.

2. A process for the removing of ammonia and hydrogen sulphide from gases, for instance coke oven gas, which contains more hydrogen sulphide than corresponds to the proportion 2 molecules NH₃ to 1 molecule H₂S, by recovery of ammonium sulphate and sulphur comprising separating from the gases ammonia, washing the gas with an aqueous suspension of an iron hydroxide and thereby removing the excess of hydrogen sulphide over said proportion, converting the thereby formed iron sulphide by oxidation into iron hydroxide and sulphur, separating and burning said sulphur and combining sulphur dioxide therefrom and the aforesaid separated ammonia and water into an aqueous solution of ammonium bisulphite, washing the gas still containing said proportion of hydrogen sulphide with said ammonium bisulphite solution and finally heating the spent solution from the last mentioned step until the thionates are converted into ammonium sulphate and sulphur.

3. A process for the removing of ammonia and hydrogen sulphide from gases, for instance coke oven gases, which contain more hydrogen sulphide than corresponds to the proportion 2 molecules NH₃ to 1 molecule H₂S, by recovery of ammonium sulphate and sulphur comprising separating from the gases ammonia, washing the gas with an aqueous suspension of a metal hydroxide and thereby removing the excess of hydrogen sulphide over said proportion, converting the thereby formed metal sulphide by oxidation into metal hydroxide and sulphur, separating and burning said sulphur and combining sulphur dioxide therefrom and the aforesaid separated ammonia and water into an aqueous solution of ammonium bisulphite, washing the gas still containing said proportion of hydrogen sulphide with such quantity of said ammonium bisulphite solution, that one molecule H2S contained in the gas is added upon with at least four molecules ammonium bisulphite and finally heating the spent solution from the last mentioned step until the thionates are converted into ammonium sulphate and sulphur.

4. A process for the removing of ammonia and hydrogen sulphide from gases, for instance coke oven gases, which contain more hydrogen sulphide than corresponds to the proportion 2 molecules NH3 to 1 molecule H2S, by recovery of ammonium sulphate and sulphur comprising separating from the gases ammonia, washing the gas with an aqueous suspension of a metal hydroxide, converting the thereby formed metal sulphide by oxidation into metal hydroxide and sulphur, separating and burning said sulphur and combining sulphur dioxide therefrom and the aforesaid separated ammonia and water into an aqueous solution of ammonium bisulphite, washing the gas still containing said proportion of hydrogen sulphide with said ammonium bisulphite solution, treating the spent washing liquor from said bisulphite washing with sulphur dioxide and finally heating the spent solution from the last mentioned step until the thionates are converted into ammonium sulphate and sulphur.

5. A process for the removing of ammonia and hydrogen sulphide from gases, for instance coke oven gases, which contain more hydrogen sulphide than corresponds to the proportion 2 molecules NH3 to 1 molecules H2S, by recovery of ammonium sulphate and sulphur comprising separating from the gases ammonia, washing the gas with an aqueous suspension of a metal hydroxide, converting the thereby formed metal sulphide by oxidation into metal hydroxide and sulphur, separating the sulphur from said oxidized greater part of the metal salts, heating the so separated mass containing sulphur with sulphuric acid at a temperature above the melting point of sulphur, separating the sulphur so produced and burning said sulphur, combining sulphur dioxide therefrom with the aforesaid separated ammonia and water into an aqueous solution of ammonium bisulphite, washing the gas still containing hydrogen sulphide with said ammonium bisulphite solution and finally heating the spent solution from the last mentioned step until the thionates are converted into ammonium sulphate and sulphur.

6. A process for the removing of ammonia and hydrogen sulphide from gases, for instance coke oven gases, which contain more hydrogen sulphide than corresponds to the proportion 2 molecules NH3 to 1 molecule H2S, by recovery of ammonium sulphate and sulphur comprising separating from the gases ammonia, washing the gas with an aqueous suspension of a metal hydroxide, converting the thereby formed metal sulphide by oxidation into metal hydroxide and sulphur, separating the sulphur from said oxidized greater part of the metal salts, heating the so separated mass containing sulphur with sulphuric acid at a temperature above the melting point of sulphur, separating from the so heated sulphur the metal sulphate thus formed and adding the metal sulphate to the aqueous metal hydroxide suspension, burning the last mentioned separated sulphur and combining sulphur dioxide from said burning of said sulphur with the aforesaid separated ammonia and water into an aqueous solution of ammonium bisulphite, forming sulphuric acid from gases from said burning of said sulphur and effecting the aforesaid melting of sulphur therewith, washing the gas still containing hydrogen sulphide with said ammonium bisulphite solution and finally heating spent solution from said hydroxide washing step with the spent solution from the last mentioned step until the thionates are converted into ammonium sulphate and sulphur.

7. A process for the removing of ammonia and hydrogen sulphide from gases, for instance coke oven gases, which contain more hydrogen sulphide than corresponds to the proportion 2 molecules NH3 to 1 molecule H2S, by recovery of ammonium sulphate and sulphur comprising separating from the gases ammonia, washing the gas with an aqueous suspension of a metal hydroxide converting the thereby formed metal sulphide by oxidation into metal hydroxide and sulphur, separating the sulphur from said oxidized greater part of the metal salts, heating the so separated mass containing sulphur with sulphuric acid at a temperature above the melting point of sulphur, burning the sulphur from said sulphur melting step into sulphur dioxide and sulphur trioxide, separating from the burner gases the sulphur trioxide in the form of sulphuric acid and effecting the aforesaid melting of the sulphur therewith, burning sulphur from said sulphur melting step and combining sulphur dioxide therefrom with the aforesaid separated ammonia and water into an aqueous solution of ammonium bisulphite, washing the gas still containing hydrogen sulphide with said ammonium bisulphite solution and finally heating the spent solution from the last mentioned step until the thionates are converted into ammonium sulphate and sulphur.

8. A process for the removing of ammonia and hydrogen sulphide from gases, for instance coke oven gases, which contain more hydrogen sulphide than corresponds to the proportion 2 molecules NH3 to 1 molecule H2S, by recovery of ammonium sulphate and sulphur comprising separating from the gases ammonia, washing the gas with an aqueous suspension of a metal hydroxide and thereby removing the excess of hydrogen sulphide over said proportion, converting the thereby formed metal sulphide by oxidation into metal hydroxide and sulphur, separating and burning said sulphur and combining sulphur dioxide therefrom with the aforesaid separated ammonia and water into an aqueous solution of ammonium bisulphite, washing the gas still containing said proportion of hydrogen sulphide with said ammonium bisulphite solution and finally heating the spent solution from the last mentioned step until the thionates are converted into ammonium forming a solution containing ammonium sulphite and ammonium bisulphite having no vapour tension of sulphur dioxide and ammonia by washing sulphur burner gas after its treatment by the first aforesaid bisulphite washing step with said tension-free solution of ammonium sulphite and bisulphite.

CHRISTIAN JOHANNES HANSEN.